United States Patent
Dicker et al.

(10) Patent No.: US 8,359,285 B1
(45) Date of Patent: Jan. 22, 2013

(54) GENERATING ITEM RECOMMENDATIONS

(75) Inventors: Russell A. Dicker, Seattle, WA (US); Scott Allen Mongrain, Seattle, WA (US); Logan Luyet Dillard, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 604 days.

(21) Appl. No.: 12/562,759

(22) Filed: Sep. 18, 2009

(51) Int. Cl.
*G06F 17/00* (2006.01)
*G06F 7/00* (2006.01)
*G06Q 30/00* (2006.01)

(52) U.S. Cl. .......................... 706/45; 705/26.1; 707/705
(58) Field of Classification Search .................... None
See application file for complete search history.

(56) References Cited

U.S. PATENT DOCUMENTS

| | | | |
|---|---|---|---|
| 2006/0282304 A1* | 12/2006 | Bedard et al. | 705/10 |
| 2009/0240568 A1* | 9/2009 | Ramer et al. | 705/10 |
| 2010/0030578 A1* | 2/2010 | Siddique et al. | 705/3 |

* cited by examiner

*Primary Examiner* — Alan Chen
(74) *Attorney, Agent, or Firm* — Thomas Horstemeyer, LLP

(57) ABSTRACT

Disclosed are various embodiments of generating item recommendations. A user submitted query associated with a category of items in an electronic repository is received, each of the items being associated with reviews. Reviews relevant to the user submitted query are identified. Reviews relevant to the user submitted query are displayed with a user voting element. The user voting element allows a user to vote whether the review is relevant to the user query. Further relevance to the user submitted query is determined based at least upon the vote.

19 Claims, 6 Drawing Sheets

GENERATING ITEM RECOMMENDATIONS

BACKGROUND

Content delivery systems or applications often encourage users to author reviews, which can be published within the content delivery system or elsewhere. However, many content delivery systems fail to leverage a corpus of reviews, and many reviews are ignored by other users of the system even though the reviews may address a concern and/or question the user may have with respect to a particular item.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
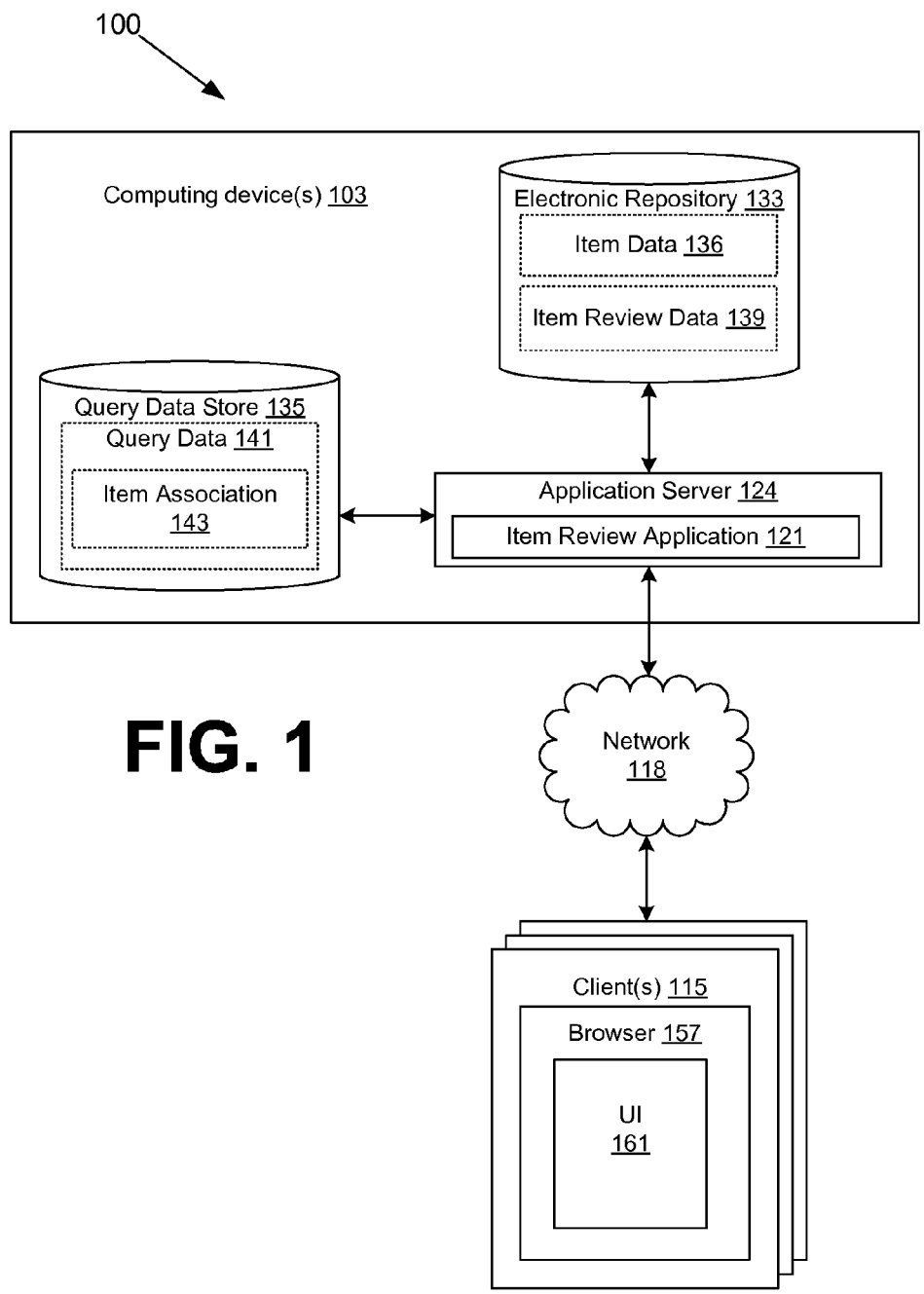
FIG. 1 is a drawing of a networked environment according to one embodiment of the disclosure.

The various embodiments described herein relate to generating recommendations for a user of a content delivery system who may be seeking advice regarding a particular item or item category, where the items are stored in and/or retrieved from an electronic repository. It should be appreciated that items stored in an electronic repository may be associated with item reviews that are authored by various users. Additionally, the various embodiments described herein can also relate to generating product recommendations for a user of an electronic commerce system implemented by embodiments of the disclosure. Such a user may be seeking advice regarding a particular product and/or product category. In this case, products may be, for example, goods and/or services. As a non-limiting example, when customers or users engage in online shopping in an electronic commerce system, many will not know a specific product that they are seeking. Rather, a user may only know that he or she is seeking a product from a product category in which there may be numerous options from which to choose.

A user may know a specific application for which they desire an item or product, or a specific problem for which they wish to find an item or a product, but they may be unaware of specific features they are seeking. As a non-limiting example, a user may know that they are seeking a television that performs well in a bright environment. While this is a specific application and/or problem they wish their desired item to address, such a specific feature may not be included in the published specifications of an item. Additionally, in the above non-limiting example, the user may have knowledge of a category from which he or she desires to purchase or obtain a product, for example, but is seeking advice regarding factors they may consider in choosing a product from within the product category.

Content delivery systems often allow users to write and/or publish reviews of items about which they may have knowledge. For example, a user may have purchased a product in an electronic commerce system implemented by embodiments of the disclosure. Accordingly, a user may author a review of the product that can be published within the content delivery system or elsewhere. In the case of an electronic commerce system, product reviews submitted by users are often solicited by electronic commerce systems without regard to questions or advice sought by other users of the electronic commerce system engaging in online shopping. Accordingly, while a user may wish to locate an item or a product for a specific application or one which can address a specific problem, reviews submitted by users who may possess knowledge of the item (e.g., a user who may have already purchased a product in an electronic commerce system) may not address the questions of other users.

Accordingly, various embodiments of the disclosure can provide item suggestions to users seeking advice on locating a particular item by receiving a user submitted query corresponding to the desires of a user in choosing an item. The user submitted query can be associated with an item category (e.g., a product category) from which a user is seeking an item, and may include a product application, a specific problem which the item addresses, or other aspects of the item that may not be included in the published specifications of various items within the category. Accordingly, embodiments of the disclosure can locate reviews submitted by other users concerning items within the item category that may be relevant to the user submitted query. In this way, the content delivery system can leverage a corpus of reviews to provide advice and/or recommendations to a user that are specific to the user submitted query and that is extracted from reviews submitted by other users.

Additionally, embodiments of the disclosure can also track queries which are highly rated, or frequently submitted by users seeking advice and/or recommendations. Highly rated or frequently submitted queries (or variants thereof) can be presented or suggested to users of the content delivery system. For example, highly rated or frequently submitted queries can be suggested to users engaging in online shopping in an electronic commerce system implemented by a content delivery system. Accordingly, in the above example, product reviews having content addressing those queries can be presented to a user that may have relevance to a large number of users shopping for products within a product category. In this way, community driven frequently asked questions (FAQ's) lists can be dynamically generated based at least upon the queries that are being submitted by the various users of the electronic commerce system implemented by the content delivery system.

Various embodiments of the disclosure can also employ the highly rated or frequently submitted queries from users of the content delivery system to prompt users who may intend to submit a review to author a review that addresses one of the queries. For example, frequently asked questions regarding a product and/or product category in an electronic commerce system can be employed to prompt users submitting a product review to author a review that addresses one of the queries. In this way, embodiments of the disclosure can encourage users to write reviews that are more relevant to advice other users may be seeking or questions about items of which they possess knowledge.

With reference to FIG. 1, shown is a networked environment 100 according to various embodiments. The networked environment 100 includes a computing device 103 implementing a content delivery system. In some embodiments, the content delivery system can implement an electronic commerce system, a search engine, a social networking system, etc. The computing device 103 is in data communication with one or more clients 115 by way of a network 118. The network 118 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a desktop computer, a server computer or like system. The computing device 103 may represent multiple computing devices arranged, for example, in one or more networks, server banks or other arrangements. The computing device 103 may be located in a single installation or may be dispersed among many different geographical locations. As a non-limiting example, data stores depicted within the computing device 103 may be implemented in a first installation while one or more of the remaining logical components of the computing device 103 may be implemented in a second installation, with the two installations in data communication with one another. For purposes of convenience, the computing device 103 is referred to herein in the singular. However, in one embodiment, the computing device 103 can represent a plurality of servers arranged as described above.

The computing device 103 is configured to execute various applications such as, for example, an item review application 121, content delivery application 124, and other applications. The item review application 121 is executed to collect and process information relating to user submitted queries regarding related products, product categories, and/or product reviews accessible to the computing device 103. In other words, the item review application 121 facilitates a user seeking advice regarding a product by leveraging a corpus of product reviews and other previously submitted user submitted queries accessible to the computing device 103. To this end, the content delivery application 124 may include network page server functionality, such as a hypertext transfer protocol (HTTP) server. Alternatively, the content delivery application 124 may be in data communication with one or more distinct server applications. In some embodiments, the functionality of the item review application 121 may be included in the content delivery application 124.

Also, the computing device 103 includes an electronic repository 133, a query data store 135 and potentially other data stores, which may comprise data and applications operable to provide access to the data stored therein. The electronic repository 133 can store information relating to content delivered to clients 115 by the content delivery application 124. To this end, the electronic repository 133 includes item data 136, which can include any data regarding an item in the electronic repository that can be provided to a user via a client 115. The electronic repository also includes item review data 139, which can include reviews authored by users and/or other entitles that are associated with items in the electronic repository 133. In one embodiment, reviews associated with an item can be retrieved from item review data 139 and encoded for display in a client 115 by the content delivery application 124 and/or item review application 121 if a user desires to view user or editorial opinions regarding a particular item in the electronic repository 133.

In the case of an electronic commerce system implemented by the depicted computing device 103, the item data 136 can comprise product data, and the item review data 139 can comprise product reviews associated with a particular product. Product data can include data regarding items offered for sale by one or more merchants in an electronic commerce system. Product data may also include many fields of data regarding each item, such as, but not limited to, product category, title, keywords, description, price, weight, shipping methods, related images, reviews, similar items, a list of merchants selling the item, stock number, other associated categories, page view history, etc.

In the above non-limiting example, product review data can include product reviews authored by users and/or other entities that are associated with products sold in the electronic commerce system. In one embodiment, product reviews associated with a product can be retrieved from product review data and rendered for display by the content delivery application 124 and/or item review application 121 if a user desires to view user or editorial opinions regarding a particular product. The electronic repository 133 can also include other data related to items as can be appreciated, but are not necessary to discuss herein for an understanding of the various embodiments of the disclosure.

The query data store 135 can store query data 141, which contains information about user submitted queries. As noted above, user submitted queries can be received by the content delivery application 124 and/or item review application 121 from users of a content delivery system seeking advice regarding items in the electronic repository 133. As a non-limiting example, a user may be seeking to purchase a television, but may wish to seek advice regarding a particular model or type of television that is suitable for a particular purpose or application. The query data 141 can also include item association data 143. Item association data 143 can include information regarding items and/or items categories with which a particular query in the query data 141 is related. As a non-limiting example, query data 141 related to a user seeking advice regarding a television can include item association data 143 that corresponds to the product and product type, which can correspond to item data 136 of an item in the electronic repository 133.

The clients 115 may comprise, for example, a computer system such as a desktop, laptop, or other computer system. The clients 115 may also comprise personal digital assistants, cellular telephones, set-top boxes, or other systems with like capability. Further, the clients 115 may also comprise any device that is network capable that may communicate with the computing device 103 over the network 118 to perform various functions. Such clients 115 may comprise, for example, processor-based devices having processor circuits comprising a processor and a memory.

The clients 115 may be configured to execute various applications such as a browser 157 and/or other applications. The browser 157 may be executed in a client 115, for example, to access and render search result pages, network pages, such as web pages, or other network content served up by the computing device 103 and/or other servers. In other embodiments, the functionality performed by the client 115 and the computing device 103 may be performed in a single computer system such as, for example, a standalone kiosk.

Next, a general description of the operation of the various components of the networked environment 100 is provided. To begin, the item review application 121 may facilitate providing advice to a user based at least upon a corpus of item reviews submitted by other users or editorial sources from item review data 139. As one non-limiting example, if a user of an electronic commerce system implemented by the content delivery application 124 is seeking a television that performs well in bright environments, the item review application 121 can locate item reviews that are associated with items in the item data store 133 in which other users have addressed whether the television performs well in bright environments. Accordingly, the item review application 121 can extract advice sought by users regarding an item and/or item category available in the electronic repository 133 from the corpus of reviews authored by other users and maintained in the electronic repository 133.

A user at a client 115 uses the browser 157 or another application to access one or more network pages served up by the content delivery application 124 over the network 118. These one or more network pages form a user interface 161 that may comprise, for example, a text input form element, hyperlinks to particular categories of items, and/or any other element capable of passing input data to the content delivery application 124. Other applications on the client 115, such as email applications, may also provide hyperlinks and/or form input elements to pass input data to the content delivery application 124.

In this way, the client 115 can provide input from a user seeking items, products, product reviews, and/or advice regarding items in the electronic repository 133. As a non-limiting example, a user may use a client 115 to seek products available in an electronic commerce system implemented by the content delivery application 124. A user can provide one or more user submitted queries describing an item, product feature, or other attribute for which advice is sought regarding items in the electronic repository 133 to the content delivery application 124. The query may comprise one or more keywords and, optionally, connectors. The query may also be an identifier (e.g., an identifier for a category) and/or any other type of criteria used to specify a query for items. As a non-limiting example, the browser 157 may send the search criteria to the content delivery application 124 by way of an HTTP GET or an HTTP POST request.

The query may then be provided by the content delivery application 124 to the item review application 121. The query can include an item category or other filters a user may apply in seeking advice for locating an item and/or item category. In the case of an electronic commerce system, the query can include a product category, brand, price, and/or other attributes of a product. Additionally, the content delivery application 124 can apply one or more filters to a query based at least upon the context in which a query is submitted. As a non-limiting example, if a user browsing for televisions available in an electronic commerce system is browsing various products within a product category, the content delivery application 124 can also provide this user context to the item review application 121.

The item review application 121 can extract reviews relating to a user submitted query by locating product reviews that are relevant to the query from the item data store 133. In addition, the item review application 121 can extract other information that may be relevant to the query. As a non-limiting example, in the case of an electronic commerce system, the item review application 121 can extract manufacturer data, specifications, data from message board or forum, customer comments that are attached to reviews, and other descriptive or editorial data regarding an item as can be appreciated. Accordingly, the reviews can be presented to a user with the item to which they correspond. In this way, the item review application 121 can provide an item recommendation responsive to the user's query by relying on a corpus of reviews authored by other users and/or editorial sources that are stored in or accessible to the item data store 133. In one embodiment, the item review application 121 can employ a text search algorithm to locate a review that is most relevant to a user's query. In another embodiment, natural language processing can be performed on the user submitted query and the reviews in the item data store 133 to locate reviews and corresponding products that are consistent with the user submitted query. In yet another embodiment, the item review application 121 can perform a sentiment analysis on the reviews and/or the user submitted query to locate reviews (and corresponding items in the electronic commerce system) that express a sentiment substantially similar to the user submitted query. As a non-limiting example, if a user submitted query in the context of an electronic commerce system specifies a television that performs well in a bright environment, the item review application 121 can locate reviews and corresponding items in which the author of the review has expressed a similar sentiment to the user submitted query.

Additionally, the item review application 121 can seek input from a user seeking advice regarding whether the item reviews and/or items presented to the user are helpful and/or relevant to a query. In the non-limiting example of a user seeking product advice in an electronic commerce system regarding a television that performs well in a bright environment, the item review application 121 can display a user voting element in a user interface 161 that can be displayed with the reviews that the item review application 121 deems relevant to the user submitted query. The user voting element can allow the user to vote on whether the review and/or item suggested by the item review application 121 represents a recommendation that the user agrees with or is relevant to the advice the user is seeking. Accordingly, the item review application 121 can also track and tabulate user votes received from users regarding the quality of its recommendations. In this way, the item review application 121 can learn whether items and/or reviews displayed in response to a user submitted query are appropriate and adjust recommendations provided to other users in the future based at least upon the tabulation of these user votes.

Additionally, the item review application 121 can store user submitted queries in the query data store 135. Accordingly, the item review application 121 can determine those queries that are most popular, most highly rated and/or frequently submitted by other users. Accordingly, the item review application 121 can also facilitate display of item reviews and/or items that are relevant to these queries. In this way, while a user may not have a specific query he or she wishes to submit in order to get advice or recommendations, the user can take advantage of queries submitted by other users that are frequently asked by viewing item recommendations and/or item reviews related to these queries.

By tracking user submitted queries that are most popular, most highly rated and/or frequently submitted by other users, the item review application 121 can also prompt other users who wish to author and submit a product review for a particular item to write reviews that address these queries. As a non-limiting example, the item review application 121 can determine that users seeking advice and/or recommendations concerning televisions in an electronic commerce system frequently submit a query related to finding a television that performs well in a bright environment. Accordingly, the item review application 121 can prompt a user writing a review regarding a television to address the question of whether a particular television for which the user is writing a review performs well in a bright environment.

Figure 2:
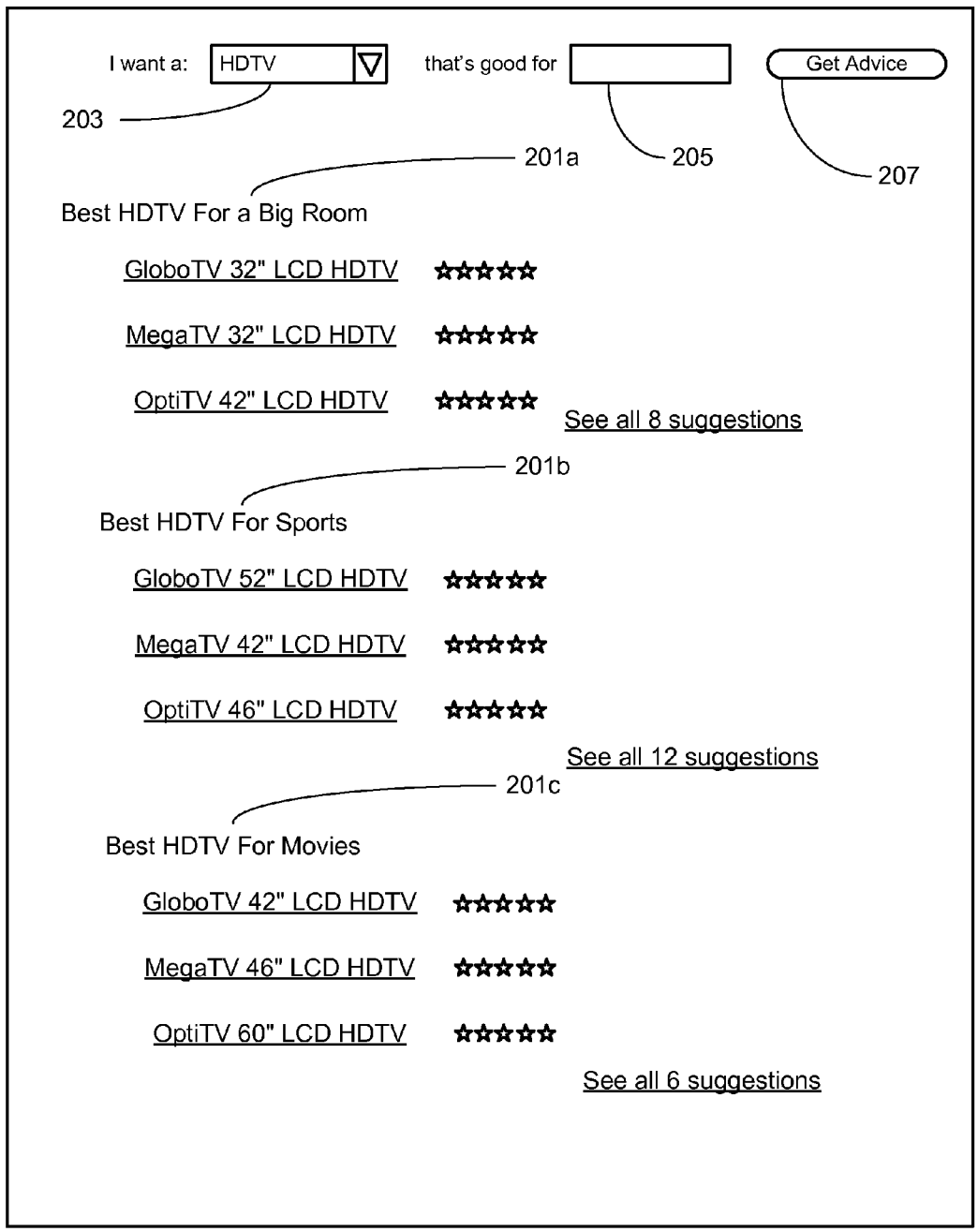
FIG. 2 is a drawing of one example of a user interface rendered by a client in the networked environment of FIG. 1 according to various embodiments of the present disclosure.

Referring next to FIG. 2, shown is one example of a user interface 161a that can be generated by the content delivery application 124 (FIG. 1) and facilitated by the item review application 121 (FIG. 1). The depicted user interface 161a can be rendered by a browser 157 (FIG. 1) executing in a customer client 115 (FIG. 1) in the networked environment 100 (FIG. 1) according to various embodiments of the present disclosure. The depicted user interface 161a is also shown in the context of an electronic commerce system implemented by the content delivery application 124. However, it should be appreciated that other contexts can be employed in accordance with the disclosure, such as, a search engine, a social network application, etc. The user interface 161a depicts an exemplary user interface 161 (FIG. 1) with which a user may interact to seek advice and/or recommendations that are based at least upon the reviews of other users of the content delivery application 124.

Items 201a, 201b, 201c, depict recommendations generated by the item review application 121 for a particular item category. In the depicted example, the product recommendations are based at least upon user submitted queries that the item review application 121 has determined are frequently submitted, most popular and/or most highly rated. It should be appreciated that that item review application 121 can also generate recommendations based on any criteria as it relates to user submitted queries, and not simply based on the above enunciated examples. Element 201a depicts that the item recommendations that follow are relevant to a user submitted query "Best HDTV For a Big Room."

Accordingly, the item review application 121 can identify products in the electronic repository 133 (FIG. 1) that are associated with item reviews that are most relevant to the user submitted query displayed by element 201a. The item review application 121 can also perform a natural language processing operation, or sentiment analysis, on the product reviews associated with a particular product category and identify those reviews expressing a sentiment that best corresponds to the user submitted query. The item review application 121 can also employ other criteria with which to generate recommendations in addition to identifying relevance and performing natural language processing. As a non-limiting example, the item review application 121 can sort the item recommendations based at least upon an editorial rating and/or a user rating (e.g., a "star" rating).

Additionally, because all user submitted queries may not be submitted to the item review application 121 and/or stored in the query data store 135 (FIG. 1) with the same syntax due to variances in the wording a user employs when composing a query, the item review application 121 may perform other language operations to the query in order to gather a plurality of queries that may vary slightly in language. Accordingly, the item review application 121 may determine that queries that vary in language, syntax, composition, etc. are in essence seeking the same or a similar answer, and combine them as a single query for the purposes of generating recommendations and displaying them in the user interface 161a.

Figure 3:
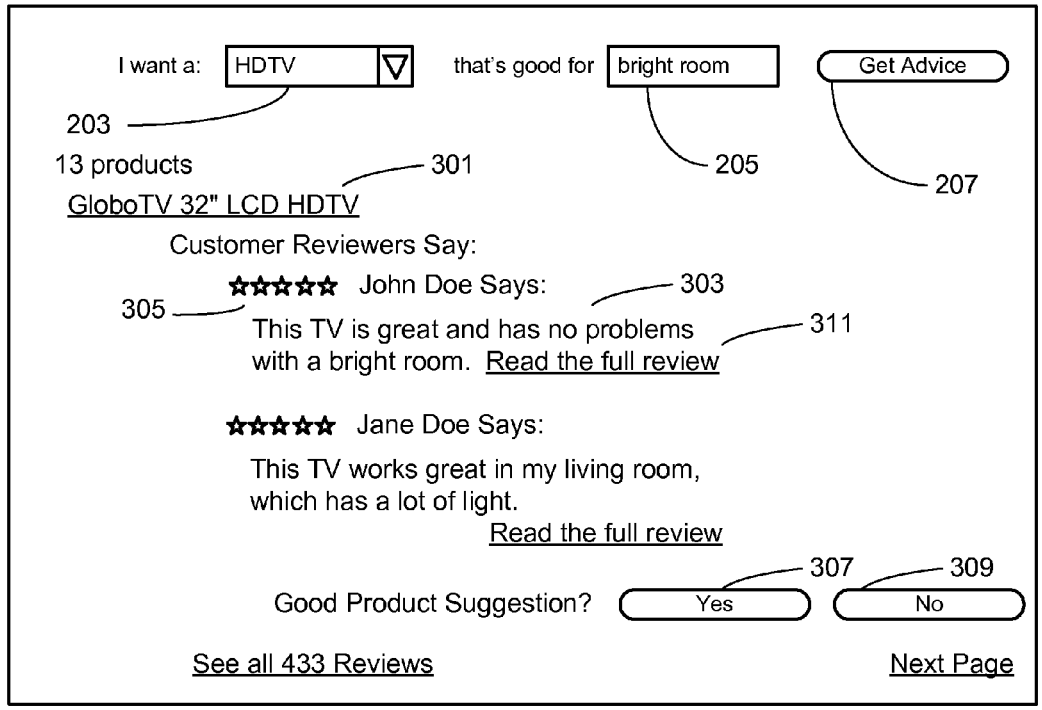
FIG. 3 is a drawing of one example of a user interface rendered by a client in the networked environment of FIG. 1 according to various embodiments of the present disclosure.

FIG. 3 also depicts additional elements 203, 205, and 207 (FIG. 2), which are non-limiting exemplary user interface elements allowing a user to submit a query to the item review application 121 (FIG. 1). In the depicted example, a user can narrow a query by item category by manipulating element 203, which is depicted as a list box. In element 205, a user can enter a query. In the depicted example, a user can enter a quality about a product that he or she is seeking. By manipulating element 207, the user can cause the item review application 121 to retrieve reviews and/or from the electronic repository 133 (FIG. 1) that are relevant to the user submitted query entered in element 205.

Accordingly, with reference to FIG. 3, shown is one example of a user interface 161b that can be generated by the content delivery application 124 (FIG. 1) and facilitated by the item review application 121 in response to a user manipulating item 207 of the user interface 161a of FIG. 2. As noted above in reference to FIG. 2, the depicted user interface 161b can be rendered by a browser 157 (FIG. 1) executing in a customer client 115 (FIG. 1) in the networked environment 100 (FIG. 1) according to various embodiments of the present disclosure. A user may interact with the user interface 161b to access reviews and/or item recommendations in response to entering a user submitted query to seek advice about identifying an item in a particular item category.

The depicted user interface 161b displays one or more item recommendations that are relevant to the user submitted query entered in element 205 by a user. Element 301 displays a product description corresponding to the item recommendation, and can be an interactive link that a user can manipulate in order to view additional details, attributes, pricing, etc., concerning the item recommendation. In the depicted example, the item recommendation can be generated by the item review application 121 by examining item reviews associated with items in one or more item categories in the electronic repository 133 (FIG. 1) and determining whether item reviews favorably discuss product performance, features, attributes, pricing, etc., such that the item reviews express a sentiment similar to or relevant to the desires expressed by the user submitted query. The item review application 121 can also rank the item recommendation based on relevance of the item reviews to the user submitted query, a tabulation of user feedback, price, and other factors that should be appreciated.

The item review application 121 also facilitates display of item reviews from the electronic repository 133 that are relevant to the user submitted query. Element 303 depicts an example of a summary of an item review retrieved by the item review application 121 that it has deemed relevant to the user submitted query. In the depicted example, the user submitted query includes an HDTV that performs well in a bright room. Accordingly, the item review application 121 retrieves (in the depicted example) a review that is relevant to or expresses a sentiment similar to the user submitted query.

The user interface 161b also depicts items 307 and 309, which allow a user to vote whether the item recommendation is consistent with the user submitted query. If a user submits a vote concerning the item recommendation, the item review application 121 can tabulate user feedback in order to improve the quality of item recommendations generated for other users seeking similar advice or those that submit similar queries. Additionally, item 311 allows a user to access a full item review associated with the recommended item.

Figure 4:
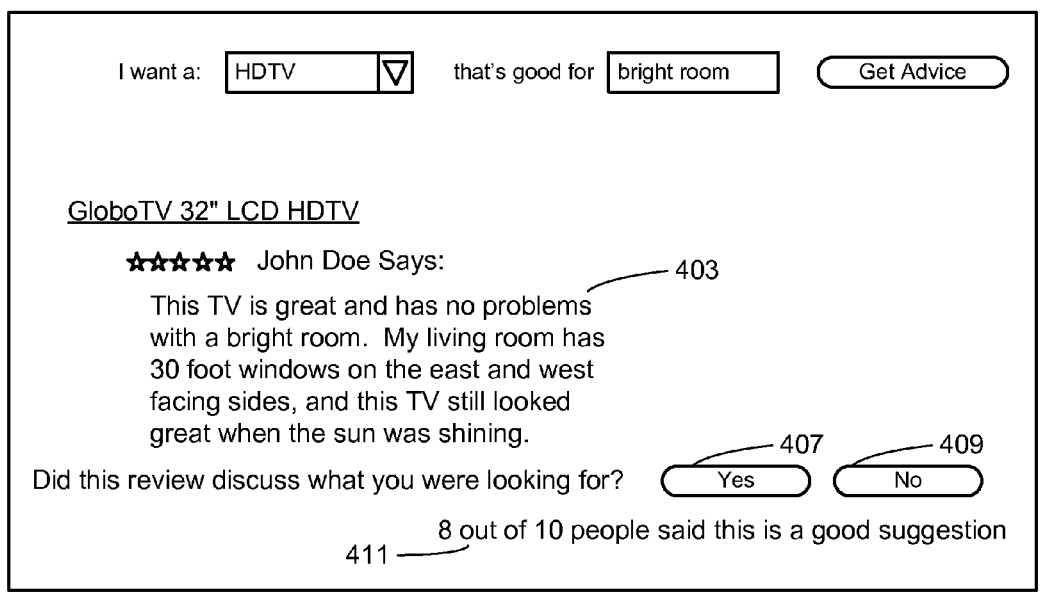
FIG. 4 is a drawing of one example of a user interface rendered by a client in the networked environment of FIG. 1 according to various embodiments of the present disclosure.

Accordingly, reference is now made to FIG. 4, which shows one example of a user interface 161c that can be generated by the content delivery application 124 (FIG. 1) and facilitated by the item review application 121 (FIG. 1) in response to a user manipulating element 311 (FIG. 3) of the user interface 161b of FIG. 3. The user interface 161c depicts an exemplary user interface 161 (FIG. 1) with which a user may interact to access item reviews associated with an item recommendation.

The user interface 161c includes item 403, which displays a more comprehensive version of an item review that the item review application 121 has determined is relevant to a user submitted query. Additionally, elements 407 and 409 allow a user to submit a vote regarding whether the review is relevant to the user submitted query. The item review application 121 can store and/or tabulate user votes to improve the quality of item reviews displayed to other users seeking the same or similar advice or submitting a similar query. Therefore, according to tabulated user votes, the item review application 121 can adjust the relevance of an item review associated with a product in the electronic repository 133 (FIG. 1).

Figure 5:
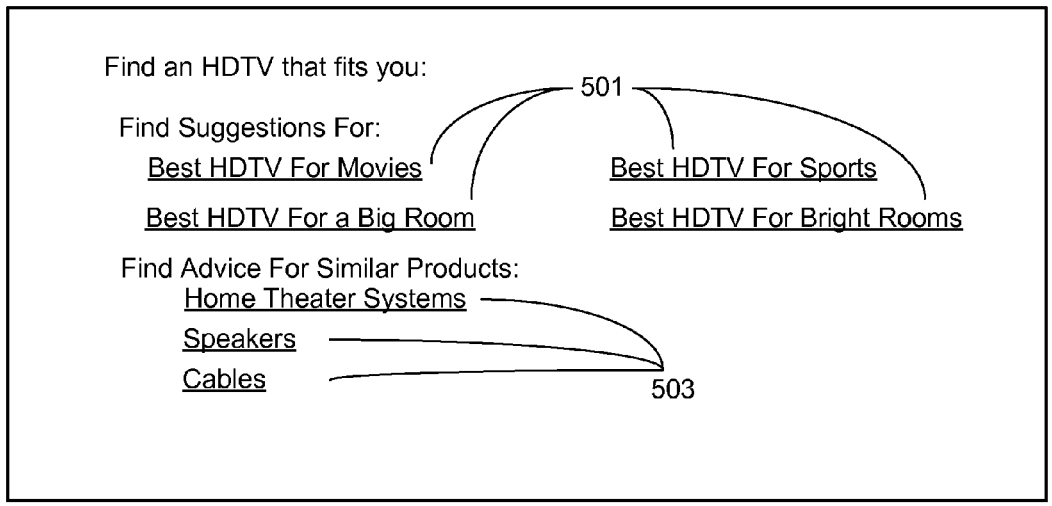
FIG. 5 is a drawing of one example of a user interface rendered by a client in the networked environment of FIG. 1 according to various embodiments of the present disclosure.

Reference is now made to FIG. 5, which shows one example of a user interface 161d that can be generated by the content delivery application 124 (FIG. 1) and facilitated by the item review application 121 (FIG. 1). The user interface 161d depicts content that can be displayed to a user seeking an item within a certain item category or displayed to users engaging in online shopping. As noted above, the item review application 121 can track and/or store user submitted queries in a query data store 135 (FIG. 1). As a result, the item review application 121 can determine queries that are popular, highly rated, and/or frequently submitted by users of a content delivery application 124.

Accordingly, the item review application 121 can facilitate the display forms of these user submitted queries to users engaging in online shopping. As a non-limiting example, in the depicted user interface 161d, if a user is browsing items within a certain item category, the item review application 121 can generate hyperlinks that allow a user to view item recommendations and/or item reviews that are relevant to the most popular user submitted queries in the item category. In the depicted non-limiting example, the item review application 121 displays element 501, which includes hyperlinks to recommendations generated by analyzing reviews associated with items in the item category for the most popular user submitted queries in the item category that are stored in the query data store 135.

Figure 6:
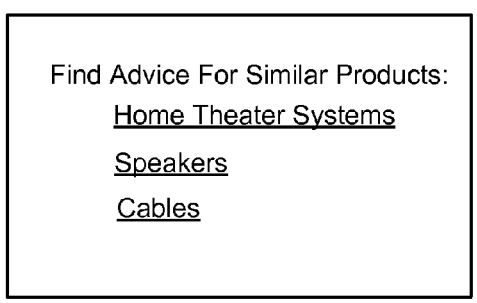
FIG. 6 is a drawing of one example of a user interface rendered by a client in the networked environment of FIG. 1 according to various embodiments of the present disclosure.
Figure 7:
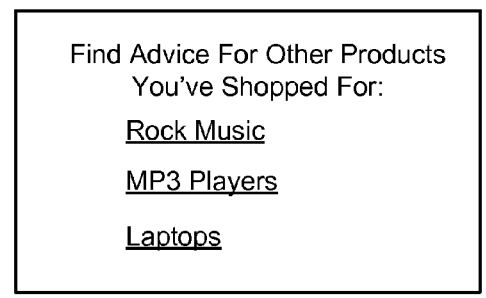
FIG. 7 is a drawing of one example of a user interface rendered by a client in the networked environment of FIG. 1 according to various embodiments of the present disclosure.

In addition, the user interface 161d can also include element 503, which, in the context of an electronic commerce system, can allow a user to access products and/or product reviews for other product categories. In one embodiment, the depicted user interface 161d can be employed in widget form as a part of a larger user interface generated 161 (FIG. 1) by the content delivery application 124. Other applications of the depicted user interface 161d should be appreciated. FIGS. 6 and 7 depict alternative user interfaces 161e and 161f that can also be utilized by the content delivery application 124 (FIG. 1) in widget form as a part of a larger user interface 161 (FIG. 1).

Figure 8:
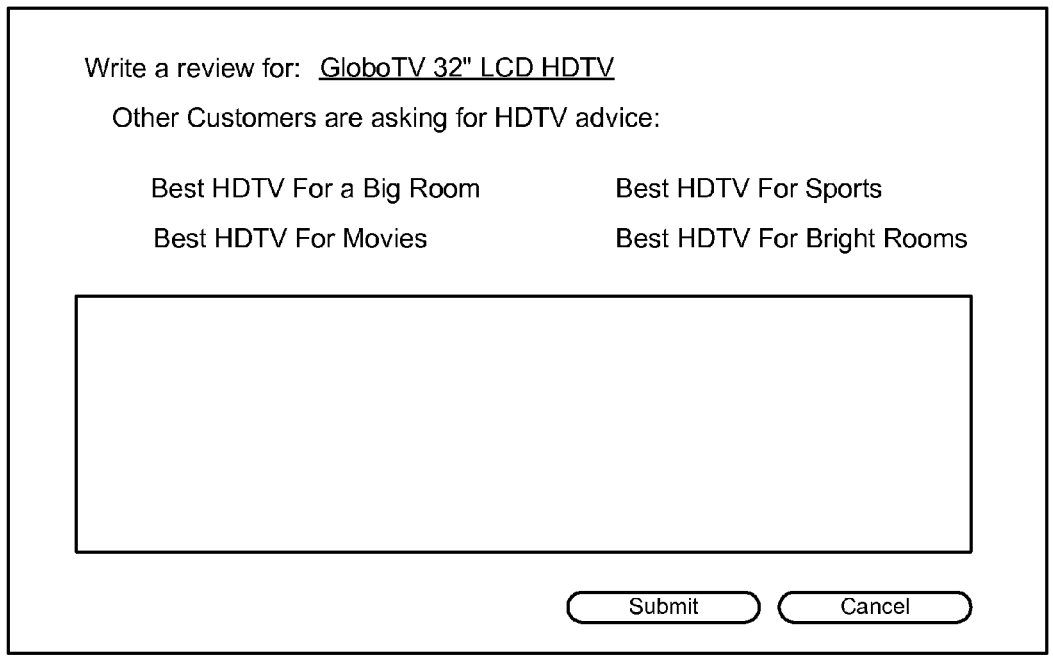
FIG. 8 is a drawing of one example of a user interface rendered by a client in the networked environment of FIG. 1 according to various embodiments of the present disclosure.

Reference is now made to FIG. 8, which shows one example of a user interface 161g that can be generated by the content delivery application 124 (FIG. 1) and facilitated by the item review application 121 (FIG. 1). The user interface 161g depicts a user interface with which a user may interact in order to submit a review to the electronic repository 133 (FIG. 1). As noted above, the item review application 121 can track and/or store user submitted queries in a query data store 135 (FIG. 1). As a result, the item review application 121 can determine queries that are popular, highly rated, and/or frequently submitted by users of the content delivery system 124 and prompt a user to submit a review associated with an item that addresses one of these user submitted queries. Accordingly, the item review application 121 can facilitate higher quality reviews submitted by authors of a review, as the reviews are more likely to address specific questions and/or topics about which other users are seeking advice and/or recommendations.

Figure 9:
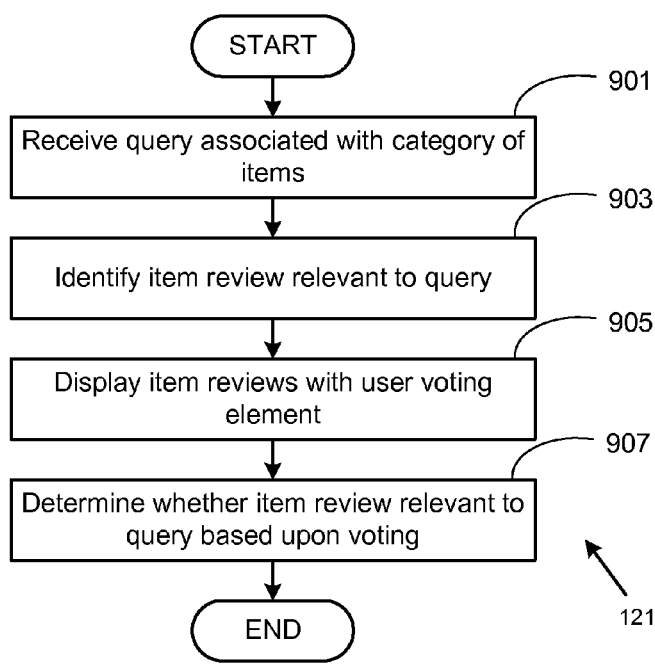
FIG. 9 is a flowchart illustrating examples of functionality implemented as portions of an item review application executed in a computing device in the networked environment of FIG. 1 according to various embodiments of the present disclosure.

Moving now to FIG. 9, shown is a flowchart that provides one example of the operation of a portion of the item review application 121 (FIG. 1) according to various embodiments. It is understood that the flowchart of FIG. 9 provides merely an example of the many different types of functional arrangements that may be employed to implement the operation of one portion of the item review application 121 as described herein. As an alternative, the flowchart of FIG. 9 may be viewed as depicting an example of steps of a method implemented in the computing device 103 (FIG. 1) according to one or more embodiments.

Beginning with box 901, the item review application 121 can receive a user submitted query. The user submitted query can be associated with an item category in which a user is seeking advice and/or recommendations related to the query. In box 903, the item review application 121 can identify one or more item reviews or items in the item category that are relevant to the user submitted query. As noted above, the item review application 121 can employ search algorithms and/or natural language processing techniques including a sentiment analysis to determine whether the sentiment expressed in the review is consistent with the advice and/or recommendation sought by a user submitting a query. In box 905, the item review application 121 can facilitate display of one or more item reviews with a user voting element that allows a user to vote whether the item review and/or recommendation generated by the item review application 121 is relevant to the user submitted query. In box 907, the item review application 121 can further determine whether the displayed item review and/or item recommendation is consistent with the advice and/or recommendation based at least upon a tabulation of user votes.

Figure 10:
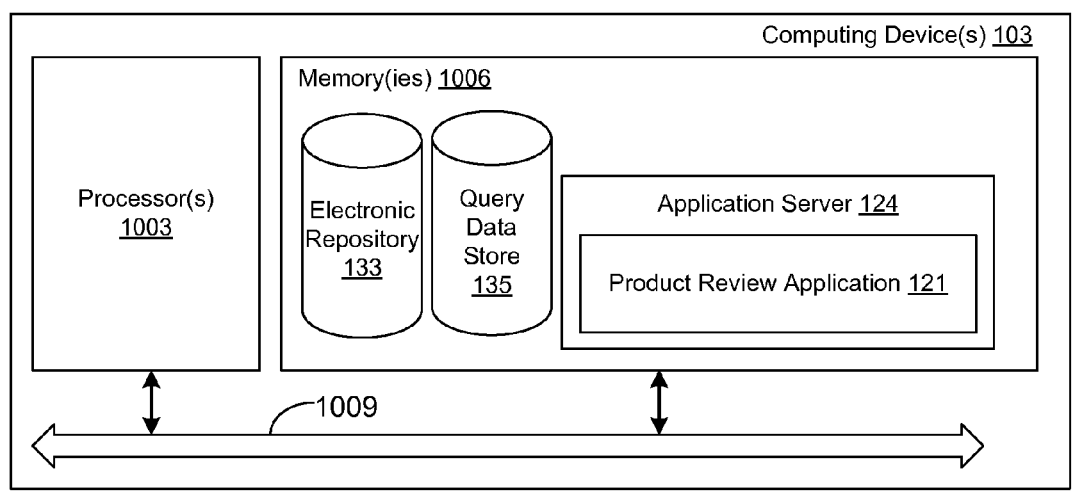
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 (FIG. 1) according to an embodiment of the present disclosure. The computing device 103 includes a processor circuit, for example, having a processor 1003 and a memory 1006, both of which are coupled to a local interface 1009. To this end, the computing device 103 may comprise, for example, a desktop computer, workstation, server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are a content delivery application 124 (FIG. 1), an item review application 121 (FIG. 1), and potentially other applications. Also stored in the memory 1006 may be an electronic repository 133 (FIG. 1), a query data store 135 (FIG. 1) and other data. In addition, a server operating system may be stored in the memory 1006 and executable by the processor 1003.

It is understood that there may be other applications that are stored in the memory 1006 and are executable by the processors 1003 as can be appreciated. Where any component discussed herein is implemented in the form of software, any one of a number of programming languages may be employed such as, for example, C, C++, Java, Java Script, Perl, Python, Flash, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network 118 (FIG. 1) that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the item review application 121, the content delivery application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 9 shows the functionality and operation of an implementation of portions of the item review application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item review application 121 and the content delivery application 124, that comprises software or code can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s)

Therefore, the following is claimed:

1. A system, comprising:
   at least one computing device; and
   item review logic executable on the at least one computing device, the item review logic comprising:
   logic that receives a request from a user to generate an item recommendation for at least one item from among a plurality of items in an electronic repository, each of the items being associated with a plurality of item reviews;
   logic that identifies at least one item review relevant to the request;
   logic that determines whether the at least one item review is associated with an item sought by the user;
   logic that stores the request in a user query data store, the request being associated in the user query data store with at least one item from the electronic repository;
   logic that identifies a subset of a plurality of requests associated with an item category in the query data store, the subset corresponding to frequently asked questions;
   logic that prompts a reviewer to generate an item review, the item review being associated with an item in the electronic repository and addressing at least one of the frequently asked questions; and
   logic that stores the item review in the electronic repository.

2. The system of claim 1, wherein the item review logic further comprises:
   logic that renders for display a user voting element, the user voting element allowing a user to vote whether the at least one item review is relevant to the request; and
   logic that determines whether the at least one item review is relevant to the request based at least upon the vote.

3. The system of claim 1, wherein the item review logic further comprises:
   logic that tabulates a plurality of user votes corresponding to a combination of the user submitted query and corresponding item reviews; and
   logic that identifies a subset of the plurality of item reviews that are relevant to the user submitted query based at least upon the tabulation.

4. The system of claim 1, wherein the logic that identifies at least one item review relevant to the user submitted query further comprises logic that performs natural language processing on the user submitted query and the item reviews associated with the items.

5. The method of claim 4, wherein the logic that performs natural language processing further comprises logic that performs sentiment analysis to identify at least one item review expressing sentiment substantially similar to the user submitted query.

6. The system of claim 1, wherein the user voting element allows the user to vote whether the at least one item review is relevant to the request.

7. The system of claim 1, wherein the item review logic further comprises logic that encodes for display at least one of the subset of requests in response to a second request seeking an item from the item category.

8. The system of claim 7, wherein the item review logic further comprises logic that encodes for display at least one item review relevant to the at least one of the subset of requests.

9. A method, comprising:
   receiving a user submitted query associated with a category of items in an electronic repository, each of the items being associated with a plurality of item reviews;
   storing the user submitted query in a user query data store, the user submitted query being associated with the category of items from the electronic repository;
   identifying at least one review in the electronic repository that is relevant to the user submitted query;
   rendering for display the at least one review relevant to the user submitted query, the review being displayed with a user voting element, the user voting element allowing a user to vote whether the at least one review is relevant to the user submitted query;
   determining whether the at least one item review is relevant to the user submitted query based at least upon the vote;
   identifying a subset of user submitted queries from a plurality of previously submitted user submitted queries, the subset corresponding to highly rated user submitted queries;
   prompting an item reviewer to generate an item review, the item review being associated with an item in the electronic repository and addressing at least one of the subset of user submitted queries; and
   storing the item review in an item review data store.

10. The method of claim 9, wherein the step of identifying at least one item review relevant to the user submitted query further comprises performing natural language processing on the user submitted query and the item reviews associated with the items.

11. The method of claim 10, wherein the step of performing natural language processing further comprises performing sentiment analysis to identify at least one item review expressing sentiment substantially similar to the user submitted query.

12. The method of claim 9, further comprising the steps of:
    tabulating a plurality of user votes corresponding to a combination of the user submitted query and corresponding item reviews; and
    identifying a subset of the plurality of item reviews that are relevant to the user submitted query based at least upon the tabulation.

13. The method of claim 9, wherein the user voting element allows the user to vote whether the at least one item review is helpful in assisting the user in finding an item in the category of items.

14. The method of claim 9, further comprising the step of rendering for display at least one item review associated with at least one of the subset of user submitted queries, the at least one item review being relevant to the at least one of the subset of user submitted queries.

15. The method of claim 9, further comprising the step of rendering for display at least one of the subset of user submitted queries to a user seeking an item from the item category.

16. The method of claim 15, further comprising the step of rendering for display at least one item review relevant to the displayed at least one user submitted query.

17. The method of claim 15, further comprising the steps of rendering for display at least one item from the electronic repository associated with the item category and the at least one of the subset of the user submitted queries.

18. A computer readable storage medium embodying a program executable by a computing device, comprising:
    logic that receives a request from a user to generate an item recommendation from among a plurality of items in an electronic repository, each of the items being associated with a plurality of item reviews;

logic that stores the request in a user query data store, the request being associated in the user query data store with at least one item in the electronic repository;

logic that identifies a subset of the requests associated with an item category from the query data store, the subset corresponding to frequently asked questions;

logic that prompts a reviewer to generate an item review, the item review being associated with an item in the electronic repository and addressing at least one of the frequently asked questions; and logic that stores the item review in an item review data store.

19. The computer readable storage medium of claim 18, further comprising:

logic that identifies at least one item review relevant to the request;

logic that determines whether the at least one item review is associated with at least one item sought by the user;

logic that renders for display the at least one item and the at least one item review to the user;

logic that renders for display a user voting element, the user voting element allowing a user to vote whether the at least one item review is relevant to the request; and logic that determines whether the at least one item review is relevant to the request based at least upon the vote.

* * * * *